Figure 1:
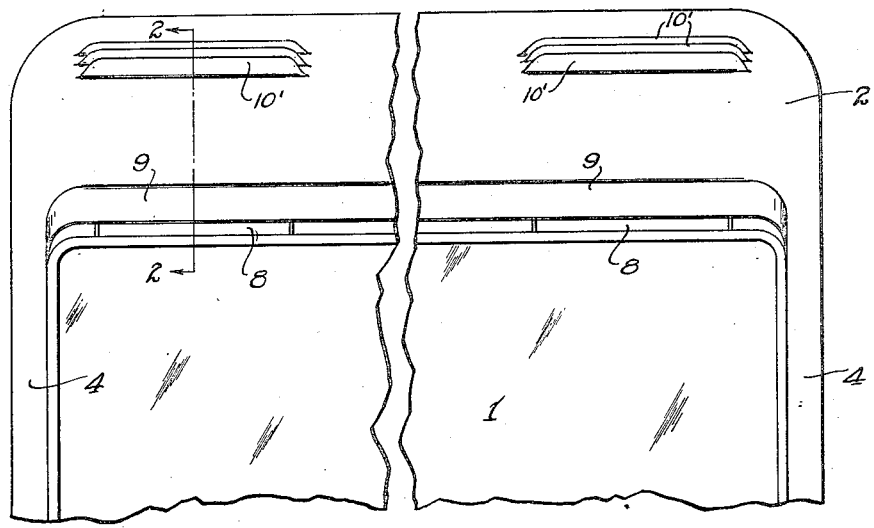

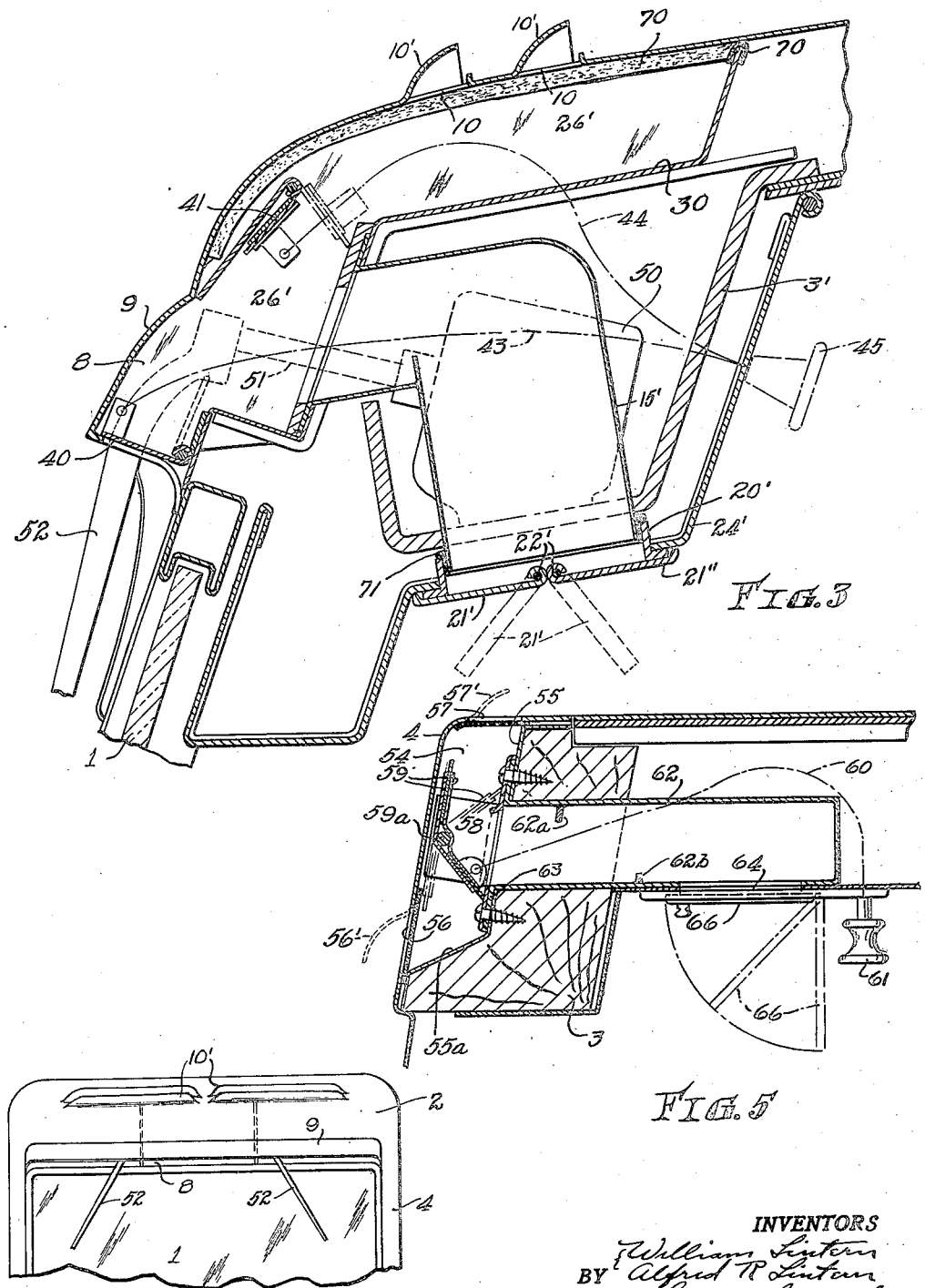

Patented May 8, 1934

1,958,056

UNITED STATES PATENT OFFICE 1,958,056

VEHICLE BODY VENTILATOR AND METHOD

William Lintern and Alfred R. Lintern, Cleveland, Ohio

Application December 3, 1931, Serial No. 578,711

4 Claims. (Cl. 98—2)

This invention relates to improvements in a ventilating and/or cooling system, method and apparatus on the order of that disclosed in the patent of William Lintern, No. 1,862,058, issued June 7, 1932.

Said patent discloses a means for exhausting air from the interior of motor vehicle bodies of the "closed" type and the arrangements therein shown are particularly characterized by there being an opening or openings in the roof structure, preferably in the cover member thereof, which opening or openings are so disposed with relation to the normal air stream passing upwardly at the windshield and then rearwardly over the body top, that a large quantity of air will be withdrawn through suitable ducts from the interior of the body by reason of the pressure differential existing between the exterior of the body and the interior thereof at such opening or openings. This arrangement, in the forms employed in said patent and rearrangements thereof developed since the filing of the application of said patent, results in changing the air in the average motor vehicle body (pleasure car) as many as 100 times per hour at average speeds, say 25 miles per hour. It is to be understood, of course, that the greater the speed, the greater the air ejection with a given adaptation.

For city driving at low speeds, the changes afforded by the air ejection method are inadequate in some cases and we have, therefore, provided and disclosed in this application, the preferred arrangements affording both air ejection and air injection in one and the same body, which arrangements are exceedingly simple to construct, are unusually compact, are pleasing in appearance and afford adequate weather protection under all practical conditions, as will be hereinafter shown.

For a more detailed explanation, it may be noted that when the ordinary closed body of an automobile is set in motion, forwardly, there exists all along the forwardly facing upright portions (windshield e. g.) considerable air pressure due to the fact that the air is abruptly deflected upwardly at these portions. This high pressure is maintained to the extent of the upper edge of the structure, where the effective "front" of the car merges with the roof. However, at the top and near the juncture of the front wall and roof wall surfaces, even though these may merge in a very generous curve, a very low pressure area exists due to the momentum of the air stream. In other words, the air stream following the windshield and maintaining high pressure thereagainst rises from the top wall, causing a vacuum or sub-normal pressure to exist for a short distance back from the juncture of top and front wall. Very little use has heretofore been made of these peculiar characteristics of the normal air stream for ventilation, and prior to the invention disclosed by said Lintern patent no one, as far as we know, sought to employ the sub-normal pressure area; at least in any effective way.

The present invention in one or more embodiments uses both the high pressure area at the front of the roof structure and the low pressure area which exists (and which may be modified as to position as we show herein) adjacent thereto. All the forms of the present invention disclosed herein are characterized by there being deflecting means inside the body covering generally and associated with or incorporated in a suitable channel or channels to cause or permit withdrawal of air from the body or other desired space, and which may also be operated to cause or permit an inrush of air through said channel or channels and into the body space, or into whatever space it is desired that such incoming air be directed to or toward.

With the above in view, an object of the present invention is to provide a more simple and effective method and apparatus for ventilating, aerating or cooling closed bodies for motor vehicles and the like.

A further object is to provide an improved, simple and effective apparatus which will operate selectively as an air injector and/or air ejector for a motor vehicle body for example, and which will not interfere with the design lines of such bodies.

Still another object is to provide a more efficient weather-proof ventilator for motor vehicle bodies and the like.

Another object is to provide a vehicle body ventilator by which as much or more air can be taken into the body as by the use of a movable windshield, whereby the body construction may be modified, simplified and improved by providing a fixed windshield, without sacrifice of air volume and at the same time securing more desirable ventilation.

Other objects and features of the invention will become apparent from the following description relating to the accompanying drawings, wherein we have shown our preferred forms. The essential characteristics of the invention are summarized in the claims.

Figure 2:
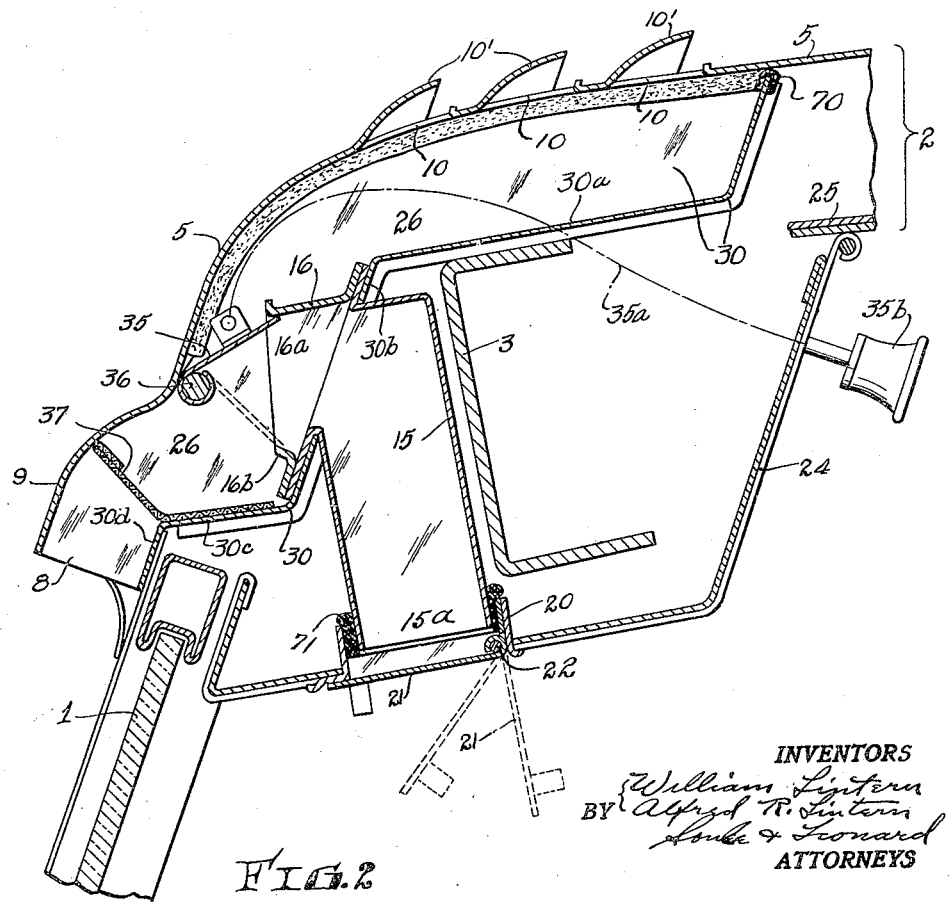

In the drawings, Fig. 1 is a fragmentary elevation of an automobile body showing portion of the roof structure and windshield and incorporating one of the simplest and most practical forms of the present invention; Fig. 2 is a cross sectional view, taken along the line 2—2 on Fig. 1, showing the details of construction of this form; Fig. 3 is a cross sectional view showing another form in which wind noise is entirely eliminated by a special shutter arrangement, this figure also showing diagrammatically the relationship of a suitable windshield cleaner to the ventilator; Fig. 4 shows a fragmentary front elevation corresponding to Fig. 3 and showing the manner in which the cleaner arm shaft parts are concealed; Fig. 5 is a longitudinal sectional view showing still another form particularly adapted to wood body construction.

Referring in detail to the drawings and first to Figs. 1 and 2, Fig. 1 shows a windshield at 1 and a roof structure generally at 2. The roof structure includes a main cross header member, shown in Fig. 2, as a steel channel 3. 4 are body posts which frame the windshield at the sides and support the forward portion of the top. Covering the foremost portion of the roof, there is shown a sheet metal cover member at 5 which may extend rearwardly over the entire top if desired, but which is ordinarily continued by other materials, such as fabric, a relatively short distance back from the front edge of the roof.

At the top of the roof structure and near the front edge of the roof are openings 10 which are the air ejection openings in this form, and which may be enhanced (at least with respect to appearance) by rearwardly extending louvers 10'. The injector openings are indicated generally at 8 and, as shown, are hooded by a suitable deflector or air scoop 9. Within the roof structure is an air duct formed in part by suitable tubular members 15 and 16, this duct being open at its forward end (at 16a) and also at its inner end (shown as extending downwardly in this form at 15a). At the inner end of the tube member 15 is a suitable finishing arrangement, such as a tubular frame 20, provided with a movable shutter or deflector 21 hinged as at 22 to a portion of the frame 20. The upwardly extending portion of the frame 20 telescopes the lower end of the tube member 15 (spaced therefrom as shown for suitable sealing material, such as a rubber ring). The shutter-deflector may be swung down to various positions, being held in place, when adjusted, by any suitable detent arrangement (not shown), the arrangement being such that the air received into the body through the tube member 15 may be thrown directly ahead onto the windshield which deflects it downwardly to the body space, or the shutter-deflector may be adjusted into lower positions, two being shown in broken lines, one position to direct the air more directly downwardly, in which case it passes over the entire body of the operator or passenger in the front seat of the car. A suitable concealing box-like casing 24 may surround the entire arrangement, including the header channel 3 and this casing may abut the inner roof lining 25 at its upper edge.

Forwardly and above the tube 15—16 and communicating therewith, there is an air channel 26 formed as by a suitable casing member 30 with side closure walls substantially joining the roof cover 5 and a connecting transverse wall, having a generally horizontal but downwardly sloping portion at 30a, downwardly inclined portion at 30b and forwardly and downwardly inclined portions 30c and 30d. All portions of the liner and casing member 30 should incline downwardly somewhat to shed water and discharge the same at the opening 8. The upper and lower portions of the channel 26 are made to selectively communicate with the tube 15—16 by reason of a valve 35 (controllable by a suitable flexible rod or wire and button 35a and 35b, for example), swingably mounted on a suitable hinge 36 for adjustment to two positions. One position allows free passage of air into the tube 15—16 from the intake opening 8, and the other (see broken line position) entirely closes the tube to entrance of air from the opening 8; meanwhile opening communication between the tube 15—16 and the upper portion of the air channel 26 for air ejection through the openings 10.

Both the openings 8 and the openings 10 may be guarded by suitable reticulated members, such as screens. In Fig. 2, a suitable screen 37 is shown as overlying the portion 30c of the casing member 30 to which the screen may be attached as by soldering or welding, the unattached portion of the screen being extended entirely across the opening 8, precluding the entrance of dust and other solid foreign material into the car body. The openings 10 may likewise be screened in any suitable way, although this is not needed as a matter of practice because whenever the openings 10 are operative at all, air is flowing out of them carrying any accumulated dust, etc. with it.

In operation, it will be seen that as the air enters the opening 8 with the valve 35 in full line position, the stream of air is deflected upwardly and forwardly by the lowermost wall portion of the tube member 16, including the flange 16b, and that the air then passes freely into the tube members 15 and 16 and down into the body as previously described. For weather protection, the air is given somewhat of a swirling motion before it enters the tube at 16a, thus precipitating moisture therefrom in rainy weather, preventing such moisture from entering the vertical portion of the tube.

The air ejection operation, with the valve 35 in its broken line position, is that the air stream passing over the top of the body causes a low pressure area to exist above the openings 10, which low pressure is enhanced to some extent by the louvers 10' positioned as shown. Due to the differential in pressure existing between the inside of the channel and the outside air above the louvers when the car is in motion forwardly, air is rapidly drawn from the body through the tube arrangements.

With the ventilator set for air ejection, the apparatus is weather-proof, even when the vehicle is at a standstill, because any water that may be blown into the openings 10, is simply shed by the downwardly inclined surfaces of the structure as above described, to run out at 8. The overhanging top wall of the tube member 16 completely sheds any and all such water away from the tube member 15, as will be obvious, the side walls of the tube member 16 being spaced from the side walls of the channel 26.

The showing of Fig. 3 is very much on the order of Fig. 2 and only the differences will be described in detail. One difference is that separate valves are provided for setting the ventilator for its air ejecting and air injecting functions. There is a valve member 40 swingably positioned over the intake opening 8 and a separate valve member 41 is swingably positioned between the upper and lower portions of the air channel 26'.

In this figure also, the downwardly extending tube member 15' passes through a suitable opening in the web of the header 3', shown as a channel with its flanges extending upwardly.

The inner end of the tube portion 15' is closed very much in the manner previously described, except that there are two deflector-shutter members 21' and 21" respectively, hinged as at 22', centrally of the opening in the lower end of the tube 15'.

With this arrangement, the incoming air (valve 40 opened and 41 closed) may be directed with greater facility into all parts of the car, for the air may be divided and part thrown forwardly and downwardly and part rearwardly in the car. Suitable detent arrangements (not shown) for the shutter-deflector may, of course, be provided to hold the shutter-deflectors in adjusted positions.

The valves 40 and 41 may be controlled by individual control rods or wires 43 and 44 respectively, leading to suitable buttons in the position indicated at 45 (Fig. 3) on the rearmost member of the general casing 24' for the ventilator.

The lip 9 which may extend entirely across the front portion of the roof structure, as shown in Fig. 4, may also conceal portions of a suitable windshield cleaner which it may be assumed, is suitably mounted beyond the ventilator side wall, as shown in broken lines at 50 (Fig. 3). The driving shaft 51 for such windshield cleaner extends, as shown, into the lip 9 and the cleaner arm 52 projects through the opening therebelow (corresponding to the opening 8 but offset transversely therefrom). A suitable relationship of ventilator and cleaner is shown in Fig. 4, wherein it will be seen that the hub and shaft portions of the cleaner are effectively concealed from view.

Referring now to Fig. 5, the header 3 is cut away for a portion of its extent on its forward face to provide an upwardly extending air channel at 54 and there is a suitable liner at 55, which may be made of suitably stiff material, such as sheet metal, so as to reinforce the header where cut away. The liner, as shown, extends downwardly along the front face of the cutaway header, and thence inclines forwardly and downwardly, forming a rain or moisture shedding surface at 55a. As shown, the intake opening 56 in the cover 4 comprises simply a suitably screened or guarded perforation which may extend horizontally a considerable distance; all the way across the roof if desired. Likewise, the air ejector opening 57 in the top portion of the cover (similarly screened as shown) may extend entirely across.

Mounted within the upwardly extending channel 54 and suitably supported by the header, as on a bracket 58, is a deflector or valve 59 shown as comprising angularly disposed blades on a suitable pivot shaft 59a. The valve may be positioned by a suitable control rod or wire 60 and button 61 inside the body and in such position as to be easily accessible for operation by the driver.

The header has an opening therethrough for receiving a suitable air duct, shown as comprising a tube member 62 flanged as at 63 for attachment (as by screws) to the forward surface of the cutaway portion of the header. The tube is provided with an opening at 64 leading into the interior of the car, the opening being adjustable for directing air in several ways by reason of an adjustable deflector and shutter 66, three positions of which are shown.

It will be seen that when the valve member 59 is positioned as shown in full lines in Fig. 5, the normal air stream (causing a low pressure area above the header) will withdraw air from the interior of the body through the opening 57, channel 54 and tube 62, assuming, of course, the deflector-shutter 66 is swung down to either of its broken line positions, or to some position intermediate the full open and full closed positions.

When the valve 59 is in the broken line position, air communication between the tube 62 and the opening 57 is precluded and communication from the opening 56 into the tube is provided. In the latter event, air rushes in at the opening 56, is deflected into the tube 62 and thence through the opening 64 into the body. In case of bad weather, the moisture in the air is precipitated therefrom by reason of providing a downwardly extending baffle at 62a which swirls and directs the rising air stream against the floor of the tube forwardly of an upstanding baffle 62b in the tube. All the moisture caught by the tube walls and the baffles (forwardly of the baffle 62b) drains to the opening 56.

If desired, both openings 56 and 57 may be hooded by suitable devices (adjustable or fixed); air scoop and air deflecting louver devices being shown in broken lines at 56' and 57' respectively.

While we have shown the ejector openings 10 (57, Fig. 5) at the top surface of the roof structure, the preferred position being, as stated, as closely adjacent the front surface of the roof as practicable—side openings may be provided instead or in addition to the top openings. In some cases, we propose to use such side openings (not illustrated) for their air ejection effect as well as for drainage of water from the air duct or channel. Louvers may, of course, be provided for such side openings say in accordance with the arrangements indicated in Figs. 2 and 3 at 10'.

In operation, particularly when the apparatus is functioning as an air injector, the air rushing into the channels provided as herein shown will produce some sound. This may be absorbed by any suitable sound deadening or absorbing means. We have found that the use of felt in various positions in the channels provided as herein shown, will greatly decrease, if not entirely eliminate, such sound. The degree of sound elimination is, of course, largely in direct proportion to the area of sound absorbing surface presented to the stream of air coming through the channel. We may use, for example, a considerable amount of felt enclosing joints and/or where desirable, simply secured to the various surfaces or edges which project inwardly from the channel or are angular. A doubled strip of felt may be provided as at 70 between the upper edges of the member 30 (see Figs. 2 and 3), continuing over as much of the upper or outward edge as desired; likewise, portions of the air duct (parts 15 and 16, Fig. 2, for example) may be lined with suitable sound absorbent material, such as felt. All joints may include sound absorbent material. For illustration, a ring of felt or the like is illustrated at 71 between the tubular member 20 and the lower end of the duct member 15, Fig. 2. The baffles and valves may likewise have sound deadening material at the surface thereof presented to air travelling through the channels.

In addition to the advantages gained by the use of the present invention in its various forms, per se, we have found that the adjustable cowl side air ejector shutters (common to many vehicles and therefore not illustrated), may be used in conjunction with the present ventilator to great advantage. With the present ventilator set for air injection into the body and the shutter-deflectors hereof (21 e. g. Fig. 2) set to direct the air toward the cowl space, the forward body interior is kept surprisingly cool and well ventilated in extremely warm and sultry weather, and at low driving speeds.

We claim:

1. A unitary vehicle body and ventilator structure, said body comprising a front wall including a transparent windshield and a top wall joined to the front wall and extending rearwardly therefrom, an injector inlet passage in one of said walls above the windshield and adapted to intercept air flowing upwardly over the windshield when the vehicle is in motion forwardly, an air ejector passage in one of said walls above the injector passage and close to the intersection of said walls, an air duct adapted to communicate with both said passages and leading to within the body, and selective means to render the duct active to convey air from the inlet passage into the body and to render the duct active to convey air from the body to said ejector passage.

2. A unitary vehicle body and ventilator construction, said body including front and top vehicle body walls, a hollow header structure joining said walls and including an outer wall cover member joining said walls, inner header parts in spaced relation to the cover member to form an air duct communicating with the interior of the body, means cooperating with the cover to form an air injector inlet passage communicating with said duct, means cooperating with said cover to form an air ejector outlet passage communicating with said duct, and means within the duct to open and close communication of said passages with the duct, whereby the duct functions at one time to convey air into the body from the injector passage and at another time to convey air from the body to the ejector passage.

3. A unitary vehicle body and ventilator construction, said body including a front wall including a transparent windshield, an injector inlet passage in said front wall above the windshield, an ejector outlet passage in the top wall closely behind the point of upward discharge of air from the windshield into the relatively rearwardly moving air stream which passes over the top wall when the vehicle is moved forwardly, a common air duct communicating with both of said passages and with the interior of the body, and means in said duct and operable from within the body to selectively communicate the body through said duct with the injector and ejector passages.

4. In an automobile body of the closed type, said body having a front wall with substantially the usual transparent windshield and framework, and side and front walls extending rearwardly from said framework and connected therewith, a hollow header structure extending transversely of the body above the windshield, said header structure including an air duct communicating with said body, an outer wall cover member forming part of said header structure and extending substantially from the upper margin of the windshield upwardly and then rearwardly over the header structure, an air ejector outlet passage through said outer cover member and communicating with said duct, and a guarding louver integrally formed with said cover member and extending upwardly and rearwardly in superposed relation to said outlet passage.

WILLIAM LINTERN.
ALFRED R. LINTERN.